United States Patent
Skaar et al.

(10) Patent No.: US 6,304,050 B1
(45) Date of Patent: Oct. 16, 2001

(54) MEANS AND METHOD OF ROBOT CONTROL RELATIVE TO AN ARBITRARY SURFACE USING CAMERA-SPACE MANIPULATION

(75) Inventors: Steven B. Skaar, 17358 Woodhurst, Granger, IN (US) 46530; Michael J. Seelinger, South Bend, IN (US); Matthew L. Robinson, Mishawaka, IN (US); Emilio J. Gonzalez Galvan, Salamanca (MX)

(73) Assignee: Steven B. Skaar, Granger, IN (US)

( * ) Notice: Subject to any disclaimer, the term of this patent is extended or adjusted under 35 U.S.C. 154(b) by 0 days.

(21) Appl. No.: 09/357,115

(22) Filed: Jul. 19, 1999

(51) Int. Cl.$^7$ .................................................. G05B 19/19
(52) U.S. Cl. .......................... 318/568.11; 901/3; 901/10
(58) Field of Search .................. 318/568.11, 568.16; 901/2, 3, 10, 41

(56) References Cited

U.S. PATENT DOCUMENTS

| | | | |
|---|---|---|---|
| 4,044,377 | * 8/1977 | Bowerman | 358/107 |
| 4,146,924 | * 3/1979 | Birk et al. | 364/513 |
| 4,187,051 | * 2/1980 | Kirsch et al. | 414/744 |
| 4,305,130 | * 12/1981 | Kelley et al. | 364/513 |
| 4,380,696 | * 4/1983 | Masaki | 219/123.34 |
| 4,402,053 | * 8/1983 | Kelley et al. | 364/513 |
| 4,488,242 | * 12/1984 | Tabata et al. | 364/513 |
| 4,575,304 | * 3/1986 | Nakagawa et al. | 414/730 |
| 4,833,383 | * 5/1989 | Skarr et al. | 318/568.16 |
| 5,300,869 | * 4/1994 | Skaar et al. | 318/587 |

* cited by examiner

Primary Examiner—Robert E. Nappi
Assistant Examiner—Rina I. Duda
(74) Attorney, Agent, or Firm—Wallace F. Neyerlin (57) ABSTRACT

A system is presented that creates vision-based, three-dimensional control of a multiple-degree-of-freedom dexterous robot, without special calibration of the vision system, the robot, or any of the constituent parts of the system, and that allows high-level human supervision or direction of the robot. The human operator uses a graphical user interface (GUI) to point and click on an image of the surface of the object with which the robot is to interact. Directed at this surface is the stationary selection camera, which provides the image for the GUI, and at least one other camera. A laser pointer is panned and tilted so as to create, in each participating camera space, targets associated with surface junctures that the user has selected in the selection camera. Camera-space manipulation is used to control the internal degrees of freedom of the robot such that selected points on the robot end member move relative to selected surface points in a way that is consistent with the desired robot operation. As per the requirement of camera-space manipulation, the end member must have features, or "cues", with known location relative to the controlled end-member points, that can be located in the images or camera spaces of participant cameras. The system is extended to simultaneously control tool orientation relative to the surface normal and/or relative to user-selected directions tangent to the surface. The system is extended in various ways to allow for additional versatility of application.

5 Claims, 5 Drawing Sheets

Distance "b" is physical
in-plane separation between
surface points

MEANS AND METHOD OF ROBOT CONTROL RELATIVE TO AN ARBITRARY SURFACE USING CAMERA-SPACE MANIPULATION

GOVERNMENT RIGHTS

This invention was made with government support from the United States Office of Naval Research. The government has certain rights in the invention.

FIELD OF THE INVENTION

The present invention relates to a means and method of determining the internal robot joint sequence whose execution will cause any of a variety of precisely specified rigid-body actions of a robot-controlled tool relative to an arbitrarily positioned, oriented and shaped workpiece, without prior mathematical characterization of the workpiece geometry/position/orientation, based upon laser-pointer-assisted vision, without calibration either of the visual means or of the robotic means or of the laser-pointer means. The invention also includes a means by which a user, with a graphical user interface, may specify task objectives in a single computer-monitor image of the workpiece surface of interest, whereupon the robot executes the three-dimensional task autonomously, precisely and without calibration.

PROBLEMS IN THE ART

The present invention remedies the problem of "wasted" or "unusable" mechanical dexterity by providing a robust and precise means to control that dexterity relative to arbitrarily located workpiece surfaces. Robots with five, six or more degrees of freedom, now commonplace, typically have the mechanical dexterity needed to accomplish a very wide array of practical three-dimensional tasks, with extremely high precision, on arbitrarily located/oriented workpieces. Nevertheless, this dexterity is seldom applied to the broad range of mechanically possible ends because of the lack of an effective, practical control technology which the present disclosure discusses. "Dexterity", in this context, refers to the intrinsic, mechanical ability to bring about the desired series of tool position/orientation poses, as required for the task at hand, by means of servo control of the individual, internal degrees of freedom (typically joint rotations) of the robot.

For example, consider the task of etching or routing a figure, using a rotating tool, into an arbitrarily located surface: If either the workpiece, robot, or both are moved such that the workpiece surface is adequately within the robot's workspace or "reach", and if the appropriate etching tool is rigidly fixed to the robot's outermost (end) member, there will exist a sequence of easily trackable joint rotations, internal to the robot, which will complete the etching, with extremely high precision, as the task has been specified relative to the surface.

In practice, however, absent the presently disclosed art, it is prohibitively difficult and time-consuming to identify the requisite robot joint-rotation sequence; it is seldom "worth the trouble" to use a robot for a single workpiece/robot repeat cycle, or for small-lot operations, and therefore the aforementioned dexterity is not exploited. The same intrinsic mechanical ability to utilize robots, but control impracticality, pertains to a wide variety of surface-relative tasks which require dexterity, including cutting, drilling, all kinds of surface preparation (cleaning, sanding, scouring, painting), grasping of objects of known geometry, certain kinds of assembly, digging, excavating, fastening, gluing, laying down adhesives, welding, inspection, surgical applications and so on.

Where the previously mentioned task, etching or routing, is automated with existing technology, it is overwhelmingly commonly the case that the workpiece is constrained or fixtured such that the surface of interest has a precisely established position and orientation relative to a low-degree-of-freedom, planar, highly calibrated control system which guides the etching or routing tool. This need for a fixturing operation precludes applications where the workpiece cannot be accommodated within the fixture for any of a variety of reasons including workpiece size, shape, or location.

Because of the lack of an effective, practical robot-control technology—which technology the present work discloses—effective automation of the etching task is often precluded. As mentioned, however, insofar as mechanical dexterity is concerned, many common robots in existence today are mechanically capable of the requisite motion if placed adequately near to the workpiece surface; the limiting aspect of sensing and control extends beyond etching and routing to the variety of other tasks mentioned above; therefore, the prospects for expanded use of dexterous robots via the present enabling technology is enormous.

Most present, practical, 3-dimensional applications of robots make use of the "teach-repeat" mode of operation; here, the requisite joint rotations for a given task/workpiece location are first established ("taught"), usually by a human operator, and these sequences are "blindly" repeated with each consecutive workpiece by using servo control at each joint in order to recover the taught internal joint configurations. This not only precludes moving the robot base into the environment of a fixed workpiece (e.g. a building facade or an aircraft); it also requires that each new workpiece be precisely repositioned as the prototype. The present art allows for movement between operations of the robot base, and does not require the precise location of the workpiece within the robot's workspace preceding each repeat cycle.

Types and Deficiencies of Existing Methods of Robot Supervision and Control (other than the "teach-repeat" mode)

One example of particular need for robot application is space operations. Where robots have been used to engage satellites or manipulate objects in orbit, "teleoperation" by astronauts who are also in orbit and who generally have direct visual access both to the robot and the object of interest, has been applied.

Teleoperation has many proposed forms, but its meaning is restricted in this discussion to those systems where actuation of all degrees of freedom of the robot are directly controlled in real time by the human teleoperator. The exact means of human input can vary from kinematically similar exoskeletons, wherewith the robot mimics the motion of the operator, to joystick input where there is a relationship between rate and direction of the motion of the robot and various deflections of the joystick.

The practical problem encountered with this approach is related to the need for clear visual access to the pertinent manipulation event. Significant loss of capability is associated with all forms of indirect (e.g. video) transmission of visual information to the operator; this problem is worsened dramatically with even slight delays in signal transmission between the remote system and the teleoperator. Where such delays are on the order of minutes, such as, for example, with proposed Earth-to-Mars teleoperation, meaningful remote control is virtually impossible with teleoperation.

Related to this problem is the fact of the two-dimensional nature of any image. It is very difficult for an operator to make accurate motion judgments regarding the three-dimensional world with feedback from a two-dimensional image. This problem remains even if the user is presented with a stereo rendering of the scene acquired from a pair of parallel cameras; and it tends to be of relatively little help when the user is presented with two images from different camera perspectives.

Another proposed form of human supervisory control of remote robots, "virtual reality", suffers from a kind of problem that is also more generally part of the central, very practical difficulty which has been encountered in extending the use of robots beyond the simple "teach-repeat" mode of operation—the problem of "calibration". With the virtual-reality-based systems which have been proposed, the user is presented with visual responses to his motions which are geometrically identical to those which the actual physical system would present. The theory goes, then, that, by creating maneuver success in the virtual world, the operator creates simultaneous success in the remote, physical world.

Success with this approach is predicated upon (virtually) perfect calibration of the remote system, such that the underlying, modeled geometric relationships which permit correspondence between the actual and virtual events are accurate at least to within the levels of physical accuracy required of the maneuver. So while the problem of teleoperation is solved (i.e. the user no longer must rely upon indirect, possibly delayed sensory—primarily visual—feedback from the remote site), a new problem—the calibration problem—is created.

While at first glance the calibration problem may not seem insurmountable (it is, after all, at least understood), a strong case can be made that it is just this problem that has historically, to date, precluded the effective, 3D use of robots outside the highly confining "teach-repeat" mode of operation. The use of computer vision, in particular, has been proposed and developed with the intent of permitting high-resolution robotic positioning absent the use of simple, joint-level/"teach-repeat"—with its concomitant demands for precise prepositioning of each consecutive workpiece. Evidence of the impracticality of relying on calibration of imaging systems and robot kinematics, in the context of three-dimensional robotic maneuvering is this: In those factory-floor contexts, where it would clearly be cost-advantageous to exploit robot dexterity and versatility by means of the use of computer vision, this use is largely unknown.

In the world of envisioned applications of virtual-reality-based control operations, computer vision will certainly be involved, and the calibration problems associated with the remote setting will be much more severe than, for instance, in the relatively well-controlled, understood setting of the factory floor.

SUMMARY OF THE INVENTION

The present invention overcomes the problems and deficiencies in the art by combining the technology of U.S. Pat. No. 4,833,383, "Means and Method of Camera-Space Manipulation" with newly introduced system components—a pan/tilt-mounted laser pointer and graphical user interface (GUI),—and associated, newly introduced, methods.

The disclosure presents a practical new means by which a remote user can, with a single image of the object surface of interest, specify objectives of a task which may be described in terms of positioning particular tool junctures relative to user-specified surface points. Also included is a robust means by which an uncalibrated, remote system—consisting of a manipulator, two or more cameras, and a pan/tilt-mounted laser pointer —may be used to carry out the maneuver with very high precision and reliability. This means is based upon the method of "camera-space manipulation", wherewith use is also made of a conveniently located but uncalibrated laser pointer. The laser pointer is placed upon an uncalibrated, autonomously actuated, pan/tilt unit, and is used to create the compatible maneuver objectives in participating remote cameras, as required by camera-space manipulation.

Devised to allow a user to designate surface locations relative to which any of a wide variety of mathematically prescribed, precise manipulator actions are to be taken using camera-space manipulation, without system calibration, the invention entails the following components: a manipulator, a laser pointer mounted upon a pan/tilt unit, and two or more cameras; the cameras may also be mounted on a pan/tilt unit, and all elements are connected to, and controlled by, a host computer operated via computer monitor by a human supervisor. One of the cameras is designated as the "selection camera" and at least two cameras are designated as "CSM cameras". A given camera may be designated as both.

The operator locates, either by cursor motion, or (more likely) by "point-and-click" mouse control, junctures on an image of the surface of interest as it appears in the operator's monitor. If, for example, the task is a drilling task, the operator may "click" on those surface junctures where holes are to be placed; if it is a cutting task, two points may be designated: one to denote the starting place of the incision and a second to designate the terminus. Depending upon the task and the level of user control over the task, varying numbers of operator-prescribed points may be specified. Additionally, points may be interpolated in the two-dimensional "selection-camera space", based upon user designations and the prescribed maneuver characteristics. The operator may select other aspects of the maneuver, for example, the depth of a hole or incision.

With the surface points of interest selected in the selection camera, the laser-pointer-bearing pan/tilt unit is actuated in such a way as to create laser-spot locations on or near the prescribed locations in two-dimensional selection-camera space. This is accomplished in any of a variety of ways; however it generally involves adaptive identification and use of the two-by-two Jacobian matrix of partial sensitivities of increments in camera-space spot-center coordinates to increments in pan/tilt angular coordinates. With adequate convergence of the laser-spot center onto each selection-camera point, the CSM cameras likewise detect the corresponding spot centers in their own camera-spaces thereby permitting a local mapping from selection-camera space into CSM-camera space, from which compatible "camera-space objectives" for implementation of a variation of the patented method of camera-space manipulation can be determined; these objectives may be taken as being composed separately of "tool-point-position objectives" and "perpendicularity objectives".

Following this, camera-space manipulation (CSM) is invoked to determine the sequence of internal manipulator joint rotations necessary to satisfy the maneuver-specific camera-space objectives—thereby assuring the precision and robustness for executing the designated maneuver which is unique, and inherent, to the method. As always with CSM, this entails camera-specific "identification" and adjustment of the "camera-space kinematics" while the motion ensues. Typically, the tool will bear marks which aid in the speed and precision with which camera-space locations of known points on the tool may be located for this purpose.

UTILITY OF INVENTION

The eventual range of prospective applications of the invention is very broad because of the breadth of useful actions that, in one way or another, are described by the motion of one or more junctures on a tool or grasper relative to designated surface points. Heretofore, with few exceptions, direct human guidance of all degrees of freedom of the tool or grasper has been necessary (absent the ability to preposition the workpiece with adequate precision for fully automatic "teach-repeat" robotics.) The present invention not only relieves the need for human direction of tool degrees of freedom (either through the human's own arm/hand manipulation or a mechanical extension), but the invention also brings to the purpose at hand the steadiness, reliability, timing ability, weight-bearing ability, and freedom from fatigue afforded by use of an autonomously controlled robot.

The range of possible and useful applications is believed to be very broad. In addition to drilling and cutting, applications would include all kinds of surface preparation: cleaning, sanding, scouring, painting, etc. Applications also include grasping objects of known geometry and certain kinds of assembly, as well as digging, excavating, fastening, nailing, gluing, laying down adhesives and sealers, welding, etc. Successful existing experimental applications include etching a complex monogram at prescribed depth into wood.

OBJECTIVE OF INVENTION

Human direction of dexterous robotic manipulators has, for a variety of reasons, been a matter of considerable interest and investigation for many years. Among these reasons is the desirability of applying dexterous, mechanical motion where considerations of steadiness, physical or mental fatigue, strength, freedom from danger, inaccessibility to humans, human-error elimination, or distance make it undesirable or impossible for direct human manipulation to be applied.

For all of the desirability of such a system, however, the repertoire of methods available to achieve the combination of human supervision and reliable mechanism control are few and generally very demanding (often prohibitively demanding) either for the human supervisor/controller, or for the system designer and builder, or both. This creates an often expensive need to adapt tasks and equipment to the point where direct human control is possible, e.g., as in the case of space manipulation, the taking of extraordinary steps to allow direct human teleoperation or calibration-intensive virtual-reality-based human control.

Because of the aforementioned ubiquity of practical tasks that can be considered in terms of a precisely described action of positioning of one or more points on a tool relative to prescribed surface locations, the invention seeks to achieve robustly this precisely described action by combining the versatility and intuitive appeal of computer-monitor-based surface-point selection with the precision, robustness, and freedom-from-calibration of autonomous manipulation based upon the patented method of camera-space manipulation.

DETAILED DESCRIPTION OF THE PREFERRED EMBODIMENT

A detailed description of the preferred embodiments of the present invention will now be set forth. This description is intended to assist in an understanding of the invention and is not intended nor does it limit the scope of the invention.

Reference will be taken to the accompanying figures, which are described and captioned above.

The present invention advances over the previous U.S. Pat. No. 4,833,383 by extending the principles of camera space manipulation insofar as creating a new and generally useful means by which camera-space objectives may be imparted to the system combining the use of a Graphical User Interface (GUI) means, a laser pointer means, and selection camera means.

Figure 1:
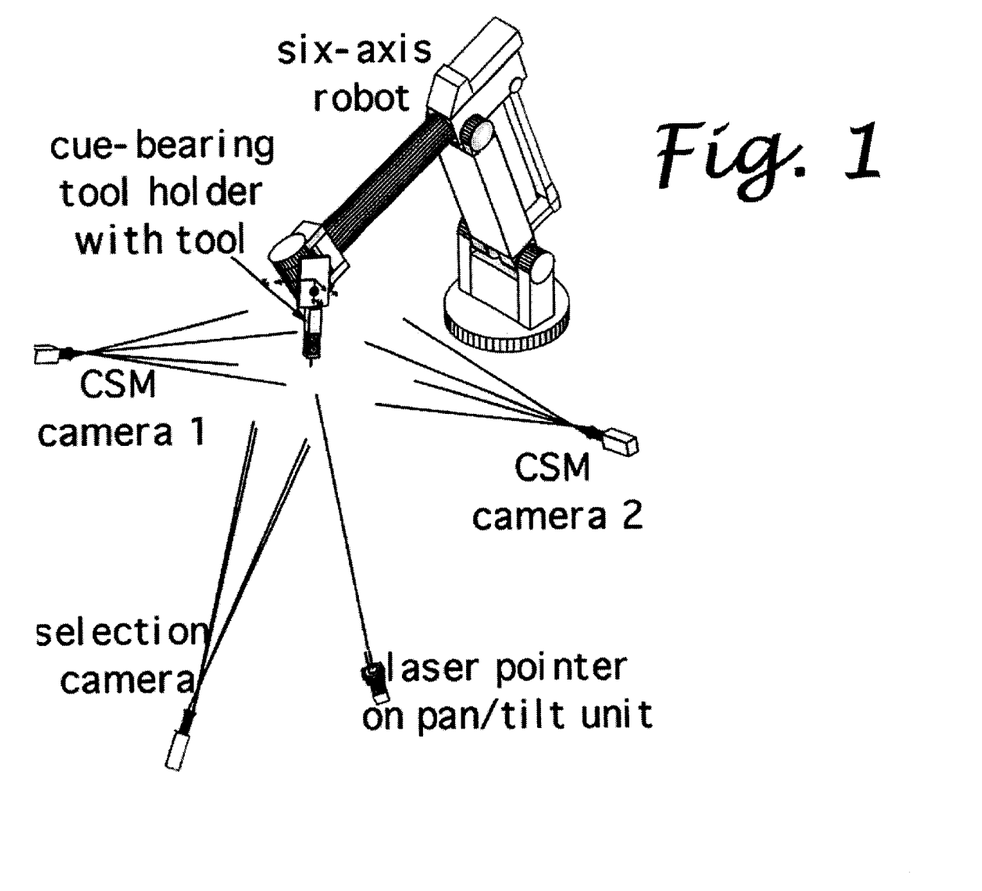
FIG. 1 Robot task-selection and control system including robot means, cue-bearing tool or tool holder means, selection camera means, two CSM camera means, and laser pointer means which is placed upon a computer-controlled pan/tilt unit means. Not shown are the host computer means and the monitor and GUI means.
Figure 2:
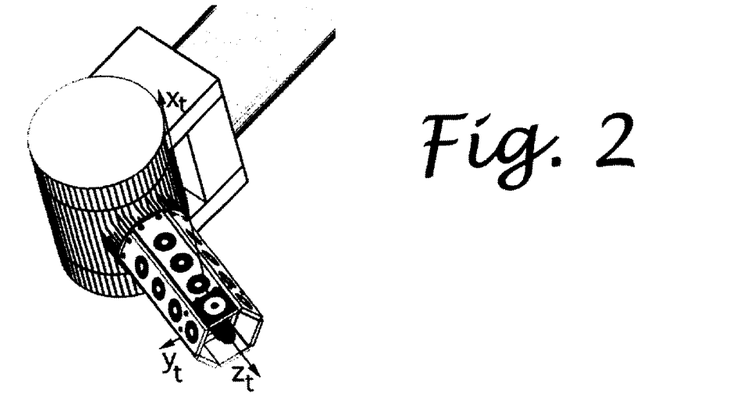
FIG. 2 An example of a cue-bearing "generic" tool holder. New tools, as required for the task at hand, are inserted into the tool holder such that the position of key points on the tool insert have precisely known three-dimensinal position relative to the cue centers on the tool holder.

The purposes for which this new class of embodiments is intended are considered very broad and new applications across this broad range of embodiments are considered easily adapted since they generally require no new consideration of image analysis from geometry to geometry of the workpiece and/or of the tool; the tool or tool holder will bear cues similar to those indicated in FIGS. 1 and 2; and junctures of interest on the workpiece will be recognized by image differencing involving images acquired with and without the laser pointer turned on.

The starting point of discussion of the preferred embodiment lies with the user selection of the mathematical description of the task at hand. In particular, all tasks must be specified in terms of the three-dimensional positional coincidence of a designated point, or set of points, on the conceptual extension of the tool (or tool holder; see FIG. 2) relative to user-designated points on the surface of interest, for example, the surface indicated in the monitor of the drawing of FIG. 3. Depending upon the number of degrees of freedom of the manipulator available, or used for a given task, tasks must further be specified in terms of the desired physical, three-dimensional orientation of the tool relative to the surface, and/or relative to the current velocity-vector direction of the surface operation.

Figure 3:
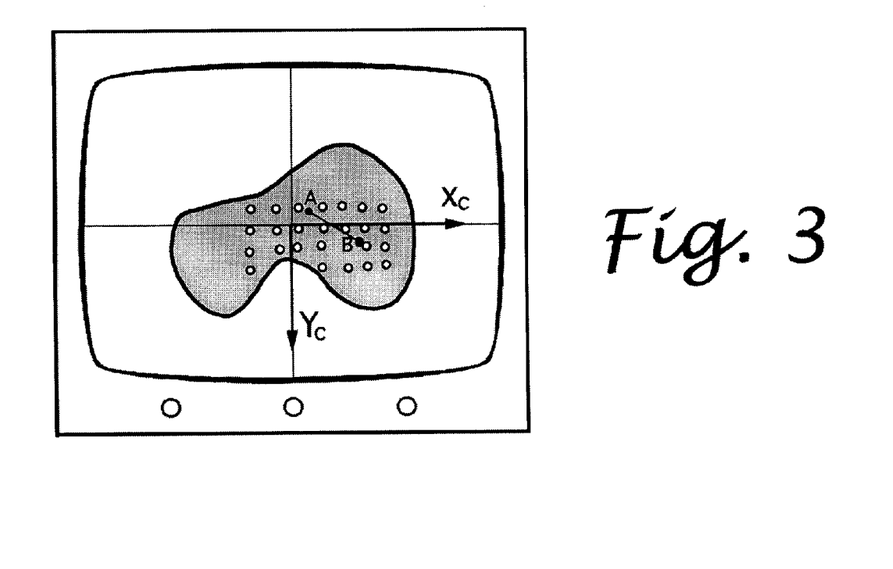
FIG. 3 Monitor showing an image of the surface of interest as acquired by the selection camera. Point A has been selected on the surface and point B is in the process of being "clicked upon" via GUI.

For example, consider the surface which appears in the monitor of FIG. 3. The physical task is that of cutting an incision 1 mm in depth, with the knife perpendicular everywhere to the surface between the GUI-designated endpoints, "A" and "B", of FIG. 3. The trace of the incision would not necessarily be a straight line; rather it would be that trace on the physical surface which "maps" into the selection-camera image of FIG. 3 as a straight line (or any other user-prescribed selection-camera curve) connecting "A" and "B" of FIG. 3.

Figure 4:
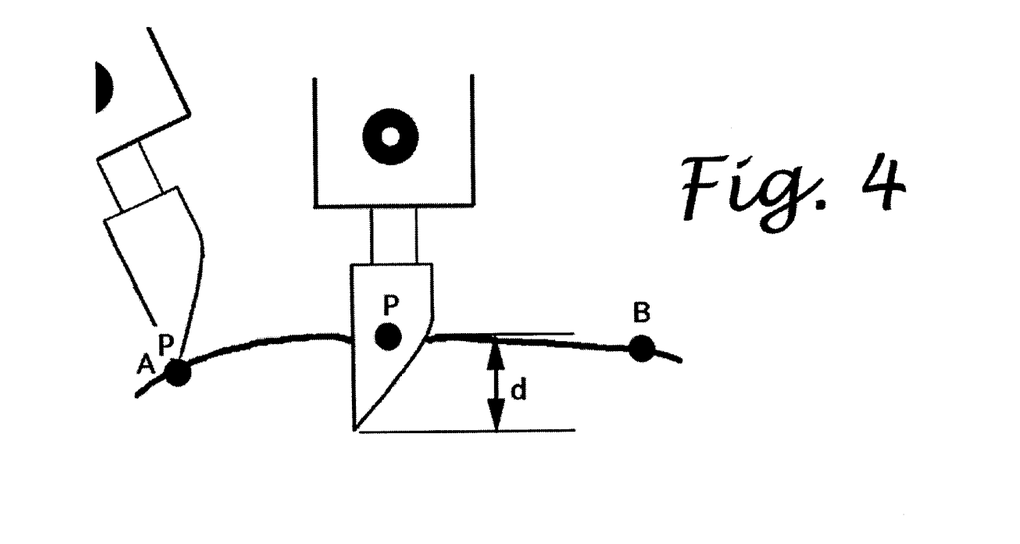
FIG. 4 Cutting tool cutting between points A and B; illustration of variation in the definition of point P on the physical tool during task execution.

The definition of the task entails position and orientation objectives. As an example, the position objectives associated with task execution as indicated in FIG. 4 includes approaching point A as selected on the surface in the selection image with a depth d initially of zero. This is followed by a gradual shift in the location of point P corresponding to the user-selected cutting depth d=2.0 mm. The surface point with which point P is made to coincide moves in selection-camera space along the (in this example straight) line indicated in the selection-camera monitor of FIG. 3. In so doing, P tracks the actual physical surface contour. This extent of position specification/realization requires three degrees of robot freedom. The added requirement, indicated in FIG. 4, of perpendicularity of the cutting tool with the surface-tangent plane at P requires an additional two degrees of robot freedom. Finally, tool orientation such that the blade is aligned with the velocity of P requires one additional degree of robot freedom for, in the case of this particular task, a total of 6.

Figure 5:
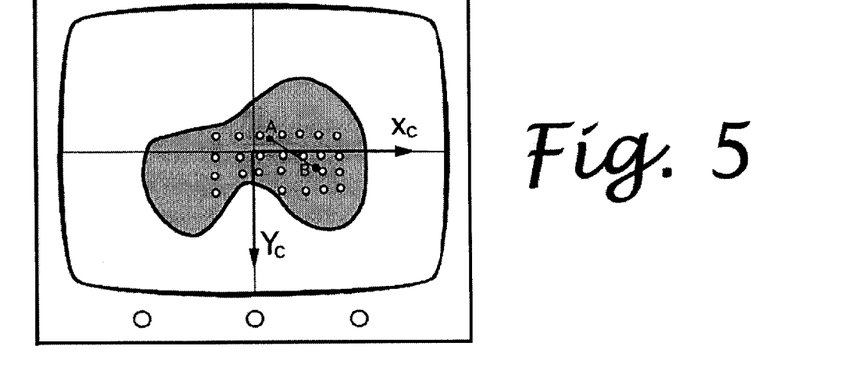
FIG. 5 Monitor of same (selection-camera) workpiece view of FIG. 3 illustrating typical sequence of locations of actual laser spots.

The camera-space objectives associated with the (minimum of two) CSM cameras, insofar as any intermediate position objective, such as shown in FIG. 4, is concerned, are as follows:

The pan- and tilt-angles of the typically wall-mounted laser-pointer-bearing unit depicted in FIG. 1 are adjusted in such a way that the computer-controlled laser pointer, mounted on the pan/tilt unit, produces a sequence of approximately equally spaced points as the laser spot falls on the workpiece of interest, as indicated in FIG. 5. Each time a spot center is determined to be located/in the image plane of the selection camera to within a desired pixel tolerance, a computer program finds the center of the spot both as it appears in the selection camera and as it appears in each of the minimum of two CSM cameras.

The means by which the laser pointer and pan/tilt unit are controlled in order to accomplish this, and the means by which the laser-spot centers are actually detected and located in the selection-camera and CSM-camera image planes are discussed below. First, however, we discuss a way in which the laser-spot information may be used to translate one or more selection-camera workpiece-surface target points into CSM target points for the point P of interest on the tool.

Figure 6:
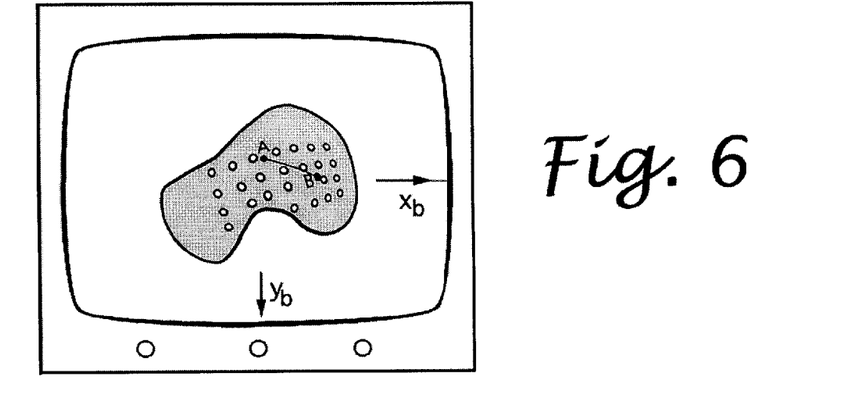
FIG. 6 Same laser-spot array as that appearing in FIG. 4, but as it appears in one CSM camera space.

FIG. 6 indicates the image of the workpiece surface in one CSM camera which is not also serving as the selection camera of FIGS. 3 and 5. Based upon the methods discussed below, it is assumed here that the centers of sequentially placed laser spots as they appear in the selection camera may likewise be detected, and located accurately, and identified in the CSM camera space of FIG. 6.

The coordinates of the with spot or cue in the selection-camera space are denoted by $(x_c^i, y_c^i)$ whereas the corresponding point in the CSM camera indicated in FIG. 6 are denoted by $(x_b^i, y_b^i)$. It is assumed that n spot centers which match 1-to-1 in the two camera spaces are located according to these ordered pairs.

The mapping of points on a region of interest of the workpiece surface in selection-camera space into CSM-camera space may, in some cases, be considered locally to conform to a linear transformation, given by $x_b = B_{11} x_c + B_{12} y_c + B_{13} = g_x(x_c, y_c; B)$ $y_b = B_{21} x_c + B_{22} y_c + B_{23} = g_y(x_c, y_c; B)$ with $B = [B_{11} B_{12} B_{13} B_{21} B_{22} B_{23}]T$ Suitability of this transformation is predicated upon a reasonably flat physical surface and a small extent of the considered surface region relative to the separation between these points and each of the two cameras focal points. Accommodation of departures from this ideal can be achieved by some combination of reducing the region of the surface, increasing the density of laser spots, and/or extending the transformation above to a nonlinear transformation such as the quadratic transformation given by $x_b = B_{11} x_c + B_{12} y_c + B_{13} x_c^2 + B_{14} y_c^2 + B_{15} x_c y_c + B_{16} = g_x(x_c, y_c; B)$ $Y_b = B_{21} x_c + B_{22} y_c + B_{23} x_c^2 + B_{24} y_c^2 + B_{25} x_c y_c + B_{26} = g_y(x_c, Y_c; B)$ with $B = [B_{11} B_{12} B_{13} B_{14} B_{15} B_{16} B_{21} B_{22} B_{23} B_{24} B_{25} B_{26}]^T$ The determination of B in either of the above two models is based upon the acquisition and use of n points $(x_{ci}, y_{ci})$ and $(x_{bi}, Y_{bi})$, i=1,2, . . . , n, in the selection camera and one CSM camera, respectively, and may be achieved as follows. Defining 2n residuals as follows, $r_{2i-1} = x_{bi} - g_x(x_{ci}, y_{ci}; B_o)$ $r_{2i} = y_{bi} - g_y(x_{ci}, y_{ci}; B_o)$ i=1,2,3, . . . ,n an initial value of $B_o$ is updated according to $\{B\} = \{B_o\} + \{\Delta B\}$ where $\Delta B$ is determined according to $\{\Delta B\} = [A^T W A]^{-1} [A]^{T[W]\{\Delta r\}}$ where the elements of [A] are given by $A_{i,j} = \partial r_i / \partial B_j |_{B=B_o}$ and where [W] represents a positive-definite weighting matrix selected a priori. Generally, the purpose of applying varying weights to the individual samples relates to the expedient of placing more emphasis on samples known to be closer to the juncture of interest on the surface and/or samples known to have higher precision or accuracy.

It should be mentioned that a variety of considerations may influence the choice of the particular "n" laser-spot points, centers of which are acquired in the participant cameras, in the determination of B. One strategy is to choose the n laser-spot points which are closest to the juncture of interest in the selection-camera space. For example, consider the laser spots as they are represented in the selection camera of FIG. 5. If, as in the example below, it is desired to position point P at surface point A, and if n=5, then the selected points would be those shown in FIG. 7.

For some tasks it will be adequate to control three degrees of robot freedom only in order to bring about three-dimensional coincidence of point P on the tool with the surface-point(s) as selected in the selection camera. Consider, for instance, the selected surface point "A" of FIG. 4. Assume that, at this juncture, there is no interest in specifying tool orientation and that, as noted in the figure, point P on the tool, currently, is the tip of the blade.

The issue now is to determine the three joint rotations, $\theta_1$, $\theta_2$, and $\theta_3$, which will bring about this desired coincidence, e.g. of point P on the tool with point A on the surface. (If the robot is envisioned as a 6DOF robot such as that of FIG. 1, then it may be assumed, for purposes of this "positioning-only" illustration, that $\theta_4$, $\theta_5$, and $\theta_6$ are locked into some known set of rotations, effectively making this a three-degree-of-freedom robot.) In accordance with the procedure specified in U.S. Pat. No. 4,833,383, May 23, 1989, the relations which represent best current estimates of the CSM-camera-space location $(x_b^j, y_b^j)$, in the "jth" of m cameras, of a given juncture P located at $(x_t = x_t^P, y_t = y_t^P, z_t = z_t^P)$ on the manipulated tool (see FIG. 1) and the manipulator's vector of joint rotations $\{\Theta\} = [\theta_1, \theta_2, \ldots]^T$, are estimated and refined locally during the approach of the tool to the current position of interest. (It is important to note that the choice of $(x_t^P, y_t^P, z_t^P)$ may in fact change over the course of a given trajectory, as indicated in FIG. 4.)

The current best-estimate of this relationship in the two-dimensional "camera-j" space (as discussed in U.S. Pat. No. 4,833,383, May 23, 1989, possibly with precision enhancement as per the paper "A Precision Enhancing Measure in 3D Rigid-Body Positioning Using Camera-Space Manipulation", *International Journal or Robotics Research*, Vol.16, No.2, pp 240–257, April, 1997) is denoted here by $x_b^j = f_x(r_x(\Theta; x_t^P, y_t^P, z_t^P), r_y(\Theta; x_t^P, y_t^P, z_t^P), r_z(\Theta; x_t^P, y_t^P, z_t^P); C^j)$ $y_b^j = f_y(r_x(\Theta; x_t^P, y_t^P, z_t^P), r_y(\Theta; x_t^P, y_t^P, z_t^P), r_z(\Theta; x_t^P, y_t^P, z_t^P); C^j)$ where the functions $r_x$, $r_y$, $r_z$ are based upon the nominal, modeled, forward kinematics of the robot, as given below, and where the functions $f_x$ and $f_y$ represent the forward camera-space kinematics estimated based upon updates of the six parameters for camera j, $C^j$, with $f_x(r_x, r_y, r_z; C^j) = b_1(C^j) r_x + b_2(C^j) r_y + b_3(C_j) r_z + b_4(C^j)$
$f_y(r_x, r_y, r_z; C^j) = b_5(C^j) r_x + b_6(C^j) r_y + b_7(C^j) r_z + b_8(C^j)$ where $b_1(C) = C_1^2 + C_2^2 - C_3^2 - C_4^2$
$b_2(C) = 2(C_2 C_3 + C_1 C_4)$
$b_3(C) = 2(C_2 C_4 - C_1 C_3)$
$b_4(C) = C_5$
$b_5(C) = C_1^2 - C_2^2 + C_3^2 - C_4^2$
$b_6(C) = 2(C_2 C_3 - C_1 C_4)$
$b_7(C) = 2(C_3 C_4 + C_1 C_2)$
$b_8(C) = C_6$ A convenient functional form for the forward kinematics for a k-degree-of-freedom robot is as follows:

$[r_x, r_y, r_z, 1]^T = [Z][A_1(\theta_1)][A_2(\theta_2)] \ldots [A_k(\theta_k)][E][x_t^P, Y_t^P, z_t^P, 1]T$ where each matrix [. ] represents a standard, 4×4 "homogeneous transformation" matrix.

The first three elements of $\Theta$, $\theta_1$, $\theta_2$, and $\theta_3$, are determined by solving simultaneously for $\theta_1$, $\theta_2$, and $\theta_3$ the following three equations:

$\partial J / \partial \theta_i = 0$, i = 1, 2, 3 where $$J = \sum_{j=1}^{m} \{[x_b^j - f_x(r_x(\Theta), r_y(\Theta), r_z(\Theta); C^j)]^2 + [y_b^j - f_y(r_x(\Theta), r_y(\Theta), r_z(\Theta); C^j)]^2\}$$

where, in the definition of J above, $(x_b^j, y_b^j)$ represent target values for the positioning of P in the jth of m camera spaces. If, as in the example above, the selected surface point is point A in FIGS. 3 and 4, and if the selection-camera coordinates of point A are given by $(x_c^A, y_c^A)$, then, using current, camera-specific best estimates of B in $g_x$ and $g_y$, as described above, the targets are found according to $x_b^j = g_x(x_c^A, y_c^A; B)$
$y_b^j = g_y(x_c^A, y_c^A; B)$ Orientation Control Actual depth of the tip, for example at point B of FIG. 4, depends upon orientation control as well as the position control of P above, in this case alignment of the tool everywhere with the surface normal. Such alignment requires two additional degrees of robot freedom, bringing the number of required degrees of freedom to five. A sixth degree of freedom, available on many robots, would also enable an additional orientation specification of the tool, for example, orientation control which would rotate the blade of FIG. 4 to the point where the blade is aligned with the velocity of P.

Figure 7:
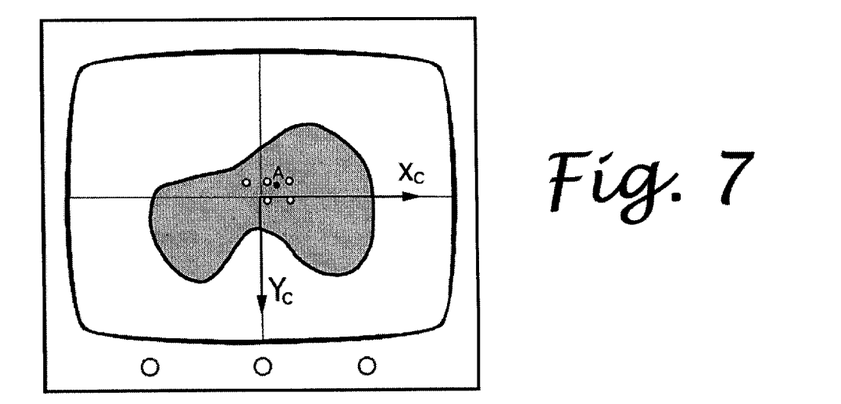
FIG. 7 Five chosen laser-spot centers for estimating B.

Orientation control begins with the selection of a number, N, of laser spots which are near to the point of interest in the selection camera. If it is of interest to establish orientation control at point A, and if N is chosen to be 5, then the five spots nearest to point A, which selection is illustrated in FIG. 7, may be taken. Numbering these points 1 to N, the estimates of the camera-space kinematic model designated $f_x$, $f_y$ above, is first used to establish the location $x_i$, $y_i$, $z_i$ of the ith of N physical laser-spot centers relative to some three-dimensional reference frame by utilizing the coordinates of the with spot center $(x_{bi}^j, Y_{bi}^j)$ in the jth of m participant camera spaces.

Making use of the $C^j$ estimates of $f_x$, $f_y$, discussed above, in the jth of m participating CSM cameras, $x_i$, $y_i$, $z_i$ are determined by minimizing over all $x_i$, $y_i$, $z_i$ the scalar function $\Gamma(x_i, y_i, z_i)$ defined as follows:

$$\Gamma(x_i, y_i, z_i) = \sum_{j=1}^{m} [x_{bi}^j - f_x(x_i, y_i, z_i; C^j)]^2 + [y_{bi}^j - f_y(x_i, y_i, z_i; C^j)]^2$$

$\partial\Gamma/\partial x_i = 0$, $\partial\Gamma/\partial y_i = 0$, $\partial\Gamma/\partial z_i = 0$, i = 1, 2, \ldots, N With these coordinates in place, the surface of form $\gamma(x, y, z; D) = 0$ (where D represents the p parameters of the surface model) which most nearly represents these surface points is determined according to:

$\partial\Phi/\partial D_k = 0$, k = 1, 2 \ldots p where $\Phi$ is given by $$\Phi = \sum_{i=1}^{N} [\gamma(x_i, y_i, z_i; D)]^2$$

With γ in place, the unit normal, $e_1$, to the surface at any particular juncture, x, y, z, is determined according to $e_1 = \text{grad}(\gamma)/|\text{grad}(\gamma)|$, evaluated at x, y, z.

Figure 8:
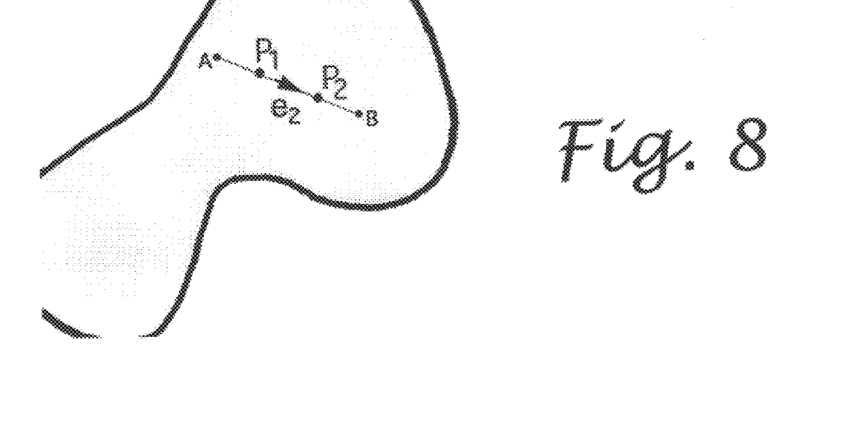
FIG. 8 Indication of in-plane unit vector in the direction of the velocity of P.

In some instances, a second unit-normal vector will be needed to orient the tool, for instance the in-plane direction of the cutting motion of point P in FIG. 4, at some intermediate juncture, for example between A and B. The unit normal, $e_2$, in the tangent plane, located near point $P_1$ on the surface, as indicated in FIG. 8, which is in the direction of $P_2$, is found according to $e_2 = (r_{P2} - r_{P1})/|r_{P2} - r_{P1}|$ where $r_{P1}$ and $r_{P2}$ are the displacement vectors of $P_1$ and $P_2$ respectively, referred to the x-y-z axes discussed above, determined from interpolated CSM-camera-space locations of the same, as discussed above. The actual procedure for interpolating, based upon designated selection-camera points (A and B, for example, of FIG. 8), to find consistent CSM-camera-space coordinates of $P_1$ and $P_2$, is discussed further below.

The actual achievement of orientation control, in addition to position control of point P on the tool, will require varying numbers of additional manipulator degrees of freedom, in addition to the 3 described above, depending upon the extent of specificity of orientation. If it is required, for example, to retain perpendicularity of a particular tool-fixed axis with the surface at any point, and if that axis is determined to be aligned with the unit vector $e_t^1 = e_{tx}^1 \mathbf{i}t + e_{ty}^1 \mathbf{j}_t + e_{tz}^1 \mathbf{k}t$, (see tool coordinate system on FIG. 2), then two joint rotations, e.g. $\theta_4$ and $\theta_5$, are determined by maximizing over all $\theta_4$, $\theta_5$ the quantity Ω given by $\Omega = \{e_1\}^T [c(\Theta)] \{e_t^1\}$ where $[c(\Theta)]$ is the 3×3 direction-cosine portion of the 4×4 matrix $[Z][A_1(\theta_1)][A_2(\theta_2)] \ldots [A_k(\theta_k)][E]$ as given above; i.e. $[c(\Theta)]$ is based upon the modeled forward kinematics of the system.

It should be noted that generally position control and orientation control are not governed by separate subsets of the vector Θ. Therefore, an iterative scheme is used wherein $\theta_1$, $\theta_2$, and $\theta_3$ are determined according to the requirements to position P, and $\theta_4$, $\theta_5$ are in turn determined as per the above, to satisfy orientation; but then a recomputation of $\theta_1$, $\theta_2$, and $\theta_3$ must occur, and so on, until convergence of Θ is achieved.

If it is desired to also control the orientation of another axis of the tool, then $\theta_6$ must become involved. In this case we maximize Ω according to $\Omega = \{e_1\}^T [c(\Theta)] \{e_t^1\} + \{e_2\}^T [c(\Theta)] \{e_t^2\}$ over all $\theta_4$, $\theta_5$, $\theta_6$, where $e_t^2$ is the unit vector aligned with a selected tool axis in the same respect as $e_t^1$ is aligned with a different (perpendicular) tool axis, as discussed above.

How to Detect Laser-Spot Centers

Figure 10:
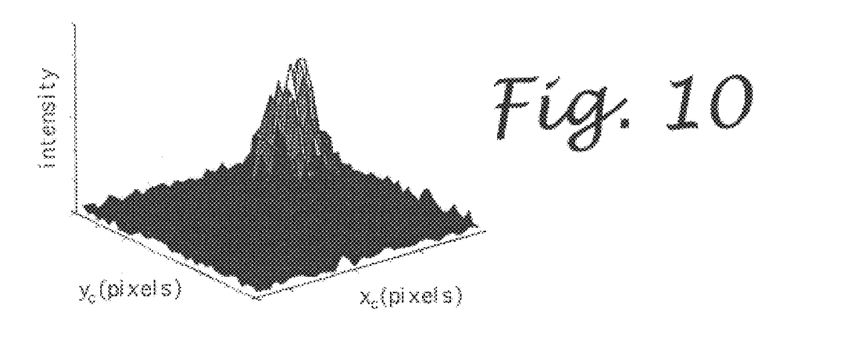
FIG. 10 Grayscale profile of laser spot in differenced image.

FIG. 10 indicates the profile of a typical "differenced" image involving a laser spot (i.e. the gray-scale profile involving the difference in 2 images—one with the pointer turned on and a second with the pointer turned off.) The means by which the spot center is actually identified should result in a high degree of compatibility as to the location of the found center in each of the participating selection- and CSM-cameras. That is to say, however the actual algorithm used to identify, and locate in an image, the center actually works, the same algorithm applied to images from azimuthally very distinct cameras should locate spot centers which represent, to within a very small error, the same physical surface point. In numerous experiments it has been determined that the following strategy does in fact identify the same spot-center location in multiple images, to within a small fraction of a pixel.

A square-symmetric matrix or "mask" of values is defined such that the center values in the matrix are highest with lower values proceeding to zero near the fringes of the mask. The size of the matrix mask is adjusted to be nearly equal that of the laser spot on the differenced image. The mask is placed or located on the differenced image in such a way that the product of the mask with the grayscale differenced image is maximum. The camera-space coordinates of the center of the mask, so located, becomes the identified location of the spot center.

How to Control Laser-Pointer Pan/Tilt Unit in Order to Position Laser Spots

With the ability described above to locate a laser-spot center in a differenced image in place, it is necessary, as discussed above, to pan and tilt the laser pointer of FIG. 1 in such a way as to produce a grid, similar to that of FIG. 5, of laser-spot centers. In other words, it is necessary to control the pan angle, φ, and the tilt angle, θ, sequentially in order to converge near a target spot center in the selection camera.

This is accomplished by first determining the error in selection-camera space, $\Delta x_c$ and $\Delta y_c$, or the difference between the desired selection-camera coordinates of the spot center and the actual, current coordinates. With this difference known, current estimates of a Jacobian matrix of partial sensitivities of selection-camera spot-center increments, to increments, Δφ, Δθ, in the pan/tilt angles is used as follows to determine the latter quantities:

$[\Delta\phi \Delta\theta]_T = [J]_{-1} [\Delta x_c \ \Delta y_c]_T$ where [J], the Jacobian of partial sensitivities, is determined as follows:

Based upon recent samples of both $x_c, y_c$, as well as the corresponding selection-camera spot center, φ, θ, the elements of J are approximated by minimizing over all $x_{co}, y_{co}$, $J_{11}, J_{12}, J_{21}$ and $J_{22}$ the scalar Θ given by $$\Theta = \sum_{i=1}^{p} [x_{ci} - (x_{co} + J_{11}\phi_i + J_{12}\theta_i)]^2 +$$
$$[y_{ci} - (y_{co} + J_{21}\phi_i + J_{22}\theta_i)]^2$$

where $x_{ci}, y_{ci}, \phi_i, \theta_i$ represent the with of p samples used in the determination of [J].

The pan/tilt unit continues to be driven according to computed increments, Δφ, Δθ, until the spot centers become adequately near their selection-camera targets. It is important to note that, because interpolation within the selection camera to determine actual CSM targets is used with as-located (rather than as-prescribed) spot-center locations, as they correspond in both cameras, there is no need to have very precise convergence onto target selection-camera locations.

How to Define Tasks and Prescribe Sel-Cam Surface Locations

The actual means by which tasks are described and selection-camera surface locations are identified, corresponding to a given task, are potentially many and varied. The discussion above entails a specific cutting task on a broad, continuous surface. Here, GUI prescription of two points on the monitor presentation of the surface, combined with depth, d, is sufficient information to control the blade using CSM, as discussed herein.

Figure 11:
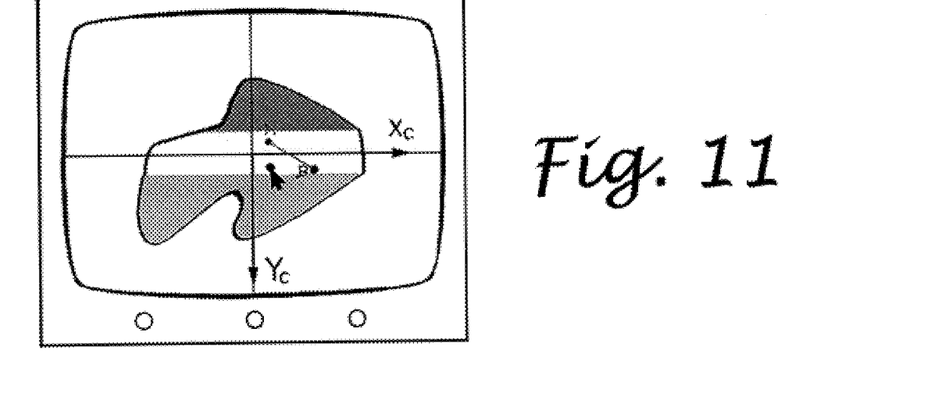
FIG. 11 Illustration of GUI selection of points on continuous-slope portion of a surface where discontinuities are near locations of interest.

In some instances, the surface of interest has discontinuities in position or slope, as illustrated in FIG. 11. For such a situation, the user might prescribe via GUI, as shown in FIG. 11, the location of points which are within the region of the surface which could be used to specify perpendicularity.

Interpolation in Task Definitions

Consider the intermediate points $P_i$ and $P_2$ on the same surface as selected points A and B of FIG. 8. Compatible CSM-camera-space maneuver objectives for these points, given the selection-camera locations A and B, can be determined as follows: First, some kind of assessment is made as to the location of the point of interest in the selection camera itself. This will typically involve some kind of direct interpolation in the selection camera, such as a prescribed fraction of the distance from point A to point B, along the straight line connecting A with B. With the selection-camera point of interest determined, the best fits of B in $g_x$ and $g_y$, as described above, for each participating CSM camera, are used to produce CSM-camera-space targets. This approach is adequate to determine the CSM locations of the points $P_1$ and $P_2$ of FIGS. 8 and 9, as discussed above.

Figure 12:
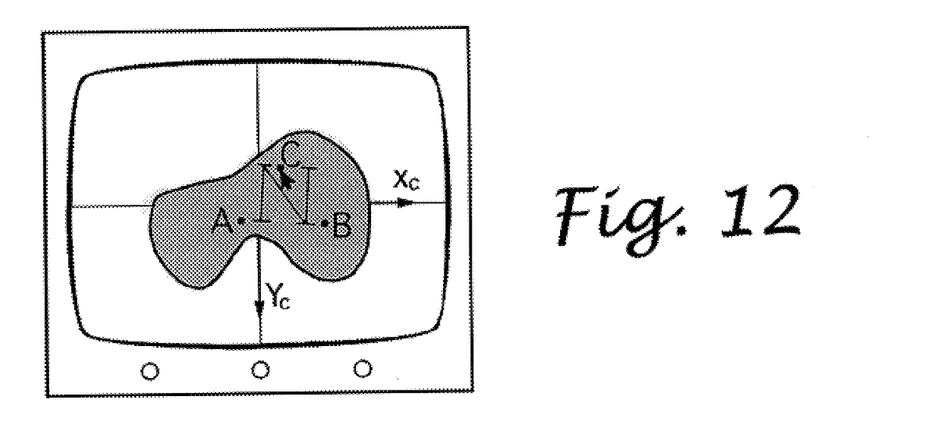
FIG. 12 Illustration of 2D interpolation
Figure 13:
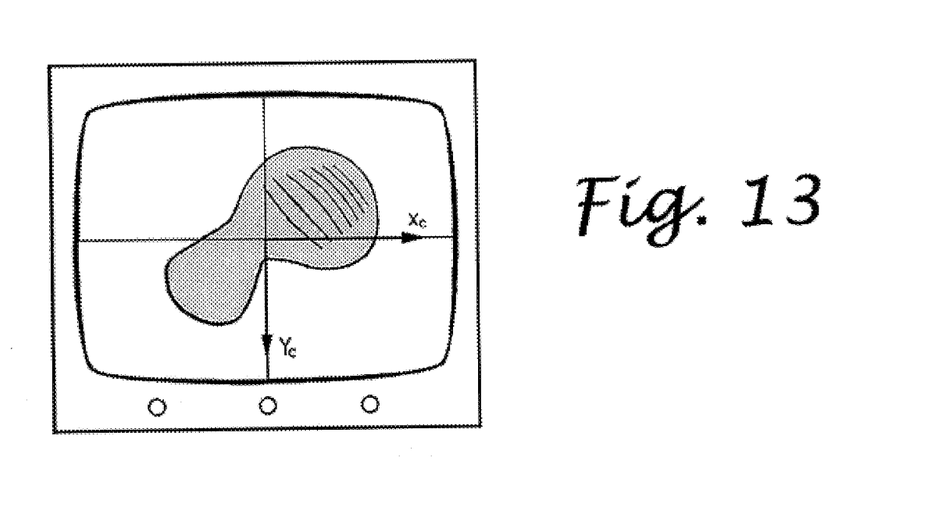
FIG. 13 Illustration of the way in which lines on a curved surface do not map into parallel lines in the selection camera.

Interpolation between any three points in selection-camera space—not all on the same straight line—will also allow for selection-camera determination/interpolation in two dimensions. Consider, for example, the figure "N" of FIG. 12. As the user locates points A and B of FIG. 12 in the selection-camera monitor the base location and figure width are established. With the further specification of point C, the height is established. Each vertex in the figure is then located both horizontally and vertically in the selection-camera image such that it is consistent with each vertex in proportion to its horizontal and vertical position on the master plan. With these vertices so established, the user can review the intended location on the image of the surface directly prior to executing the maneuver.

Intermediate target points, between and including vertices, can be established in the selection and CSM cameras by the interpolation scheme above.

It should be noted that interpolation strictly in the selection camera guarantees only that the relevant relationship among the key surface points will be ultimately realized as the original surface projects into the selection camera. In many instances, it is necessary to establish locations based upon desired fixed physical-surface distances from previously determined selection-camera points. The approach used to accomplish this is discussed below.

Adjustment of the Above for Exhaustive Physical-Surface Coverage

Many prospective applications of this technology require exhaustive covering of a portion of a surface of interest by a nozzle or scanner or some other device. In such applications it may be essential that consecutive passes have equal intervals of separation relative to the surface itself.

Figure 9:
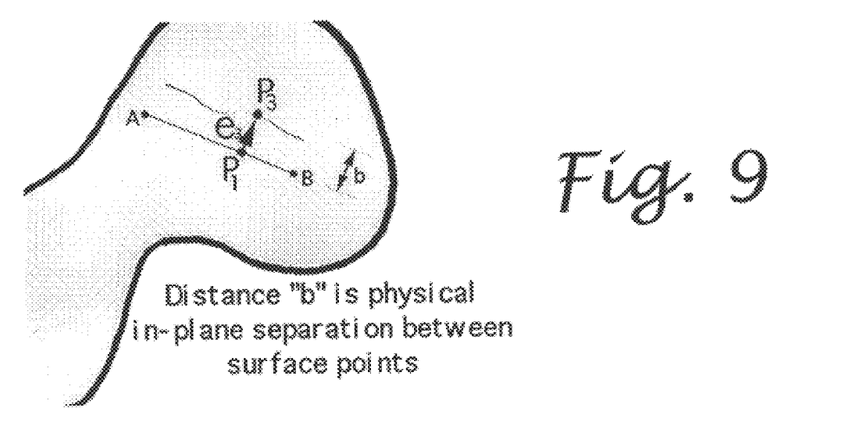
FIG. 9 Indication of selection-camera location of a point a prescribed physical distance from another selection-camera point; also indication of the inplane unit vector which is normal to the velocity of P.

Consider, for example, the surface of FIG. 9. Point $P_1$ represents an arbitrary juncture on the initial pass, which has been prescribed as a straight line in the selection-camera view of FIG. 9. Point $P_3$, on the other hand, is the selection-camera location of the point on the physical surface which is a prescribed distance b from $P_1$ in the direction of e3 on the physical plane which is tangent to the surface at $P_1$. The line on which $P_1$ lies does not appear parallel in FIG. 9 to the line on which $P_3$ appears, although the two lines are chosen specifically such that the distance separating them in the physical direction $e_3$ is "b" everywhere. The reason that the two lines do not appear parallel in the figure is that the figure shows specifically the selection-camera perspective.

Placing $P_3$ in the selection camera requires camera-specific estimates, as given above, which are relevant to the region of interest, i.e. "near" (in terms of tool position/orientation) the region where $P_1$ and $P_3$ are located. With these estimates $C^j$ available, placement of $P_3$ occurs first by calculating the coordinates of $P_3$ in the x,y,z frame discussed above. With this coordinate determined, the current mapping into CSM-camera space is used to convert the location of $P_3$ to two-dimensional CSM-camera coordinates, and finally the locally applicable functions $g_x$ and $g_y$ are used to convert these $P_3$ coordinates to selection-camera coordinates.

It will be appreciated that the present invention can take many forms and embodiments. The true essence and spirit of this invention are defined in the appended claims, and it is not intended that the embodiment of the invention presented herein should limit the scope thereof.

What is claimed is:

1. A camera-space manipulation means for allowing human supervisory control of a dexterous manipulator comprising a manipulator means with an end-member means, at least one cue means with known three-dimensional coordinates relative to said end-member means, a designated point P fixed relative to said end member means, which designated point's three-dimensional coordinates relative to the same end member means may be defined according to the task; a selection-camera means; a workpiece which is the object of the intended action of the manipulator means; a computer monitor means; a graphical-user-interface means by which the human supervisor may make a selection of the x coordinate and y coordinate of each of one or more target points; at least one other camera means; a laser-pointer means able to project small light spots onto the workpiece surface; a pan-tilt means for bearing and directing said laser pointer means; and a host computer means and associated computer-interface means able to receive and process user input, and able to send outputs pertaining to commanded internal manipulator joint angles to the manipulator means; outputs pertaining to the commanded pan and tilt angles of the pan-tilt means, outputs pertaining to the commanded on or off state of the laser-pointer means, and outputs pertaining to the triggering of acquisition of a digital form of image of each camera means whereby the human supervisor specifies one or more target points on the physical workpiece surface in the image of the camera space of the selection camera means by using the graphical-user-interface means while viewing the image of the workpiece surface in the camera space of the selection camera means with the computer monitor means, whereupon two-dimensional selection-camera target points are identified with two-dimensional camera-space target points of the other cameras, consistently with corresponding physical workpiece-surface target points as chosen by the user in the camera space of the selection camera through the detection and location in the camera spaces of both the selection camera and the other cameras of centers of placed laser spots which laser spots are placed by the laser-pointer means in which laser-spot placement is achieved by computer control of the pan/tilt means to point the laser pointer means using incremental responses in the x direction and y direction of spot-center location in the selection-camera means camera space due to incremental panning or tilting of the pan/tilt means, and where user-designated point P, which point location or sequence of locations relative to the aforementioned end-member means the user may input to the computer means according to the required task, and which point P will be located physically by computer command of the manipulator means internal degrees of freedom, which internal degree-of-freedom values are determined using camera-space manipulation, with its attendant use of the aforementioned one or more visual cue means and appearances thereof in each camera, to coincide with selected surface points and where, for certain kinds of desired action of the manipulator means, in addition to the physical positioning of designated point P, the manipulator means' degrees of freedom given a number of degrees of freedom of the manipulator means which is large enough, generally totaling five or six rotations, or translations, to meet both the position requirements of the positioning of P and two or three additional specifications of orientation, may be used to align a user-prescribed axis of the tool with the workpiece's surface normal, which surface normal alignment is achieved from the placed laser spots appearances in each camera together with camera-space manipulation and may be used to achieve prescribed tool orientation relative to a particular direction in the plane of the surface near placed spots, which tangent plane tool orientation also is achieved from the placed laser spots appearances in each camera together with camera-space manipulation.

2. The system of claim 1 where the human supervisor controls directly the laser-pointer direction, through direct control of the pan/tilt means.

3. The system of claim 1 where a multiple-spot laser pointer means is introduced that is also under computer on/off control whereby multiple light spots are applied simultaneously to the workpiece surface in order to produce camera-space objectives in all camera means which are consistent and compatible with the target points.

4. The system of claim 1 where control of force of resistance acting on the tool normal to the workpiece surface is achieved in place of position control in said normal direction, and where in-plane position is also controlled, which control of normal force of resistance is achieved by selecting P such that tool-tip depth beneath the resisting workpiece surface is in keeping with an effective stiffness function which relates said attempted tool-tip displacement into the workpiece surface to the normal force of resistance.

5. The system of claim 1 whereby a human operator, during maneuver execution, adjusts components of designated point P's position during maneuver execution whereby the position of the tool relative to the surface is adjusted during maneuver progress.

* * * * *